(12) United States Patent
Uchiike

(10) Patent No.: US 8,174,249 B2
(45) Date of Patent: May 8, 2012

(54) VOLTAGE BOOSTING/LOWERING CIRCUIT

(75) Inventor: Takeshi Uchiike, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 12/914,701

(22) Filed: Oct. 28, 2010

(65) Prior Publication Data
US 2011/0101944 A1    May 5, 2011

(30) Foreign Application Priority Data
Oct. 29, 2009   (JP) ................ 2009-248885

(51) Int. Cl.
G05F 1/24    (2006.01)

(52) U.S. Cl. ...................................... 323/259

(58) Field of Classification Search .............. 323/222, 323/224, 282, 259
See application file for complete search history.

(56) References Cited

U.S. PATENT DOCUMENTS

| | | | | |
|---|---|---|---|---|
| 5,831,418 A * | 11/1998 | Kitagawa | ............... | 323/222 |
| 6,166,527 A * | 12/2000 | Dwelley et al. | ............... | 323/224 |
| 6,677,734 B2 * | 1/2004 | Rothleitner et al. | .......... | 323/259 |
| 7,202,644 B2 * | 4/2007 | Nitta et al. | ............... | 323/259 |
| 7,265,524 B2 * | 9/2007 | Jordan et al. | ............... | 323/259 |
| 7,391,190 B1 * | 6/2008 | Rajagopalan | ............... | 323/225 |
| 7,701,179 B2 * | 4/2010 | Chen et al. | ............... | 323/259 |
| 2008/0136387 A1 * | 6/2008 | Bertele | ............... | 323/282 |
| 2011/0101944 A1 | 5/2011 | Uchiike | | |

FOREIGN PATENT DOCUMENTS

| | | |
|---|---|---|
| JP | 09-009613 A | 1/1997 |
| JP | 2009296747 A | 12/2009 |

OTHER PUBLICATIONS

Gaboriault et al., A High Efficiency, Non-Inverting, Buck-Boost DC-DC Converter, Sep. 27, 2004, IEEE, APEC'04, 1411-1415.*

* cited by examiner

*Primary Examiner* — Jue Zhang
(74) *Attorney, Agent, or Firm* — Sughrue Mion, PLLC

(57) ABSTRACT

A voltage boosting/lowering circuit in accordance with present invention includes an output voltage generation circuit including a first switch element connected between an input terminal and one end of a choke coil and a second switch element connected between the other end of the choke coil and a ground terminal, the output voltage generation circuit being configured to boost or lower an input voltage input to the input terminal and thereby to generate an output voltage by switching the first and second switch elements between an On-state and an Off-state. Further, voltage boosting/lowering circuit includes a clock generation circuit that generates voltage-boosting and voltage-lowering clocks having different timings, and a switch control unit that performs switching control of the first and second switch elements based on the voltage-boosting and voltage-lowering clocks so that negative feedback control is performed so as to bring the output voltage to a target output voltage.

5 Claims, 4 Drawing Sheets

VOLTAGE BOOSTING/LOWERING CIRCUIT

INCORPORATION BY REFERENCE

This application is based upon and claims the benefit of priority from Japanese patent application No. 2009-248885, filed on Oct. 29, 2009, the disclosure of which is incorporated herein in its entirety by reference.

BACKGROUND

1. Field of the Invention

The present invention relates to a voltage boosting/lowering circuit, in particular a voltage boosting/lowering circuit in which switching between a voltage-boosting operation and a voltage-lowering operation is controlled by using a switch (es).

2. Description of Related Art

In digital still camera sets, DC (Direct Current)-DC converters (voltage boosting/lowering circuits), which are superior in terms of the efficiency of electric power, are typically used as power supplies to increase the battery life. Further, when the output voltage accuracy of the power supply is considered to be important, current-mode DC-DC converters are used, rather than voltage-mode DC-DC converters, because they are superior in terms of the transient load response.

In recent years, the desire to increase the precision of the digital still cameras even further has been growing for the purpose of increasing the added value. As a result, it has been desired to increase the accuracy of the output voltage of power supply circuits that are used to supply electrical power to LSLs installed in the digital still cameras. Further, it has been also desired to increase the accuracy of the output voltage of power supply circuits that are used in other sets as in the case of the power supply circuits installed in the digital still cameras.

Japanese Unexamined Patent Application Publication No. 9-9613 (Patent document 1) discloses a configuration of a DC-DC converter for the purpose of supplying a stable output voltage over a wide range of input voltage. The operation of the DC-DC converter disclosed in Patent document 1 is explained hereinafter.

In the DC-DC converter shown in FIG. 4, an input voltage Vi is divided by using resistors 100 and 101, and the measured value of the divided input voltage that appears across the resistor 101 is represented by "Vr101". A power supply 102 has a voltage-boosting reference voltage Ve1 and a power supply 103 has a voltage-lowering reference voltage Ve2. The voltage-boosting reference voltage Ve1 and the voltage-lowering reference voltage Ve2 have a relation "Ve1<Ve2". A comparator 104 compares the magnitude of the measured input voltage value Vr101 with the magnitude of the voltage-boosting reference voltage Ve1. Then, when Vr101<Ve1, the comparator 104 brings its output level to "1", whereas when Vr101>Ve1, the comparator 104 brings its output level to "0".

During a period in which the On/Off signal is in an On-state, i.e., the output level of the On/Off signal is "1", when the output level of the comparator 104 is "1", an AND gate 105 outputs "1". On the other hand, when the output level of the comparator 104 is "0", the AND gate 105 outputs "0". When the output of the AND gate 105 is "1", the output of an OR gate 106 always becomes "0" irrespective of the output state of an inverter 109, and therefore a transistor 107 always becomes an On-state.

When the output of the AND gate 105 is "0", the OR gate 106 supplies the output of the inverter 109, without modifying the signal, to the control terminal of the transistor 107. As a result, the transistor 107 performs a switching action in accordance with a PWM (Pulse Width Modulation) signal output by a control unit 108. Meanwhile, a comparator 110 compares the magnitude of the measured input voltage value Vr101 with the magnitude of the voltage-lowering reference voltage Ve2. Then, when Vr101<Ve2, the comparator 110 brings its output level to "0", whereas when Vr101>Ve2, the comparator 110 brings its output level to "1".

When the output level of the comparator 110 is "1", an AND gate 111 outputs "0" irrespective of the output of the control unit 108. As a result, "0" is applied to the control terminal of a transistor 112, and the transistor 112 always becomes an Off-state. When the output level of the comparator 110 is "0", the AND gate 111 supplies the output of the control unit 108, without modifying the signal, to the control terminal of the transistor 112. As a result, the transistor 112 performs a switching action in accordance with the PWM signal output by the control unit 108.

When Vr101>Ve2, the relation "Vr101>Ve1" is naturally satisfied. Therefore, the transistor 112 is turned off. Further, the transistor 107 performs a switching action in accordance with the PWM signal from the control unit 108. Since the control unit 108 outputs a PWM signal with wide pulse intervals, a voltage-lowering operation is performed. At timing at which the transistor 107 is an Off-state, a flywheel diode 113 operates.

When Vr101<Ve1, the relation "Vr101<Ve2" is naturally satisfied. Therefore, the transistor 107 is turned on. Further, the transistor 112 performs a switching action in accordance with the PWM signal output by the control unit 108. Since the control unit 108 outputs a PWM signal with narrow pulse intervals, a voltage-boosting operation is performed. Further, when Ve2>Vr101>Ve1, both the transistor 107 and the transistor 112 perform switching actions in synchronization in accordance with the PWM signal from the control unit 108. In this case, the operation is a voltage boosting/lowering operation in which the voltage-boosting operation is the base operation. Further, the flywheel diode 113 also operates as described above.

SUMMARY

However, the present inventors have found a problem that, in the DC-DC converter disclosed in Patent document 1, when the input voltage Vi gets closer to the target output voltage Vg, fluctuations in the output voltage Vo becomes larger. The DC-DC converter disclosed in Patent document 1 detects only the input voltage Vi, and determines the switching timing from a voltage-boosting operation to a voltage-lowering operation, or from a voltage-lowering operation to a voltage-boosting operation. Therefore, when Vi>Vg, it performs a voltage-lowering operation, whereas when Vi<Vg, it performs a voltage-boosting operation. Further, it operates with stability in these states.

Meanwhile, during a process in which the input voltage Vi decreases from a high voltage state and gets closer to the target output voltage Vg, the current supply capability of the voltage-lowering circuit is lowered in proportion to the decrease of the input voltage Vi. As a result, the output voltage Vo is also lowered. When the output voltage Vo is lowered from the target output voltage Vg by a certain voltage or more, the output voltage needs to be immediately increased by performing a voltage-boosting operation. However, since the DC-DC converter disclosed in Patent document 1 performs the switching between a voltage-lowering operation and a voltage-boosting operation by detecting only the input voltage Vi, the state where the output voltage Vo has been lowered is not detected and hence the voltage-boosting operation is not performed. As a result, the output voltage Vo continues to decrease until a voltage-boosting operation is performed. Further, when the input voltage Vi becomes lower than the voltage-boosting reference voltage Ve1 and hence a voltage-boosting operation is performed after the output voltage Vo has been considerably lowered, the output voltage Vo rises abruptly. As a result, the overshoot voltage becomes larger, and hence fluctuations in the output voltage Vo becomes larger.

A first exemplary aspect of the present invention is a voltage boosting/lowering circuit including: an output voltage generation circuit including a first switch element connected between an input terminal and one end of a choke coil and a second switch element connected between another end of the choke coil and a ground terminal, the output voltage generation circuit being configured to boost or lower an input voltage input to the input terminal and thereby to generate an output voltage by switching the first and second switch elements between an On-state and an Off-state; a clock generation circuit that generates first and second clocks having different timings; and a switch control unit that performs switching control of the first and second switch elements based on the first and second clocks so that negative feedback control is performed so as to bring the output voltage to a target output voltage.

By using the voltage boosting/lowering circuit like this, negative feedback control using the output voltage can be performed. As a result, fluctuations in the output voltage with respect to the target output voltage can be suppressed to a low level.

The present invention can provide a voltage-boosting/lowering circuit capable of performing switching between a voltage-boosting operation and a voltage-lowering operation by using negative feedback control of the output voltage.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

[First Exemplary Embodiment]

Figure 1:
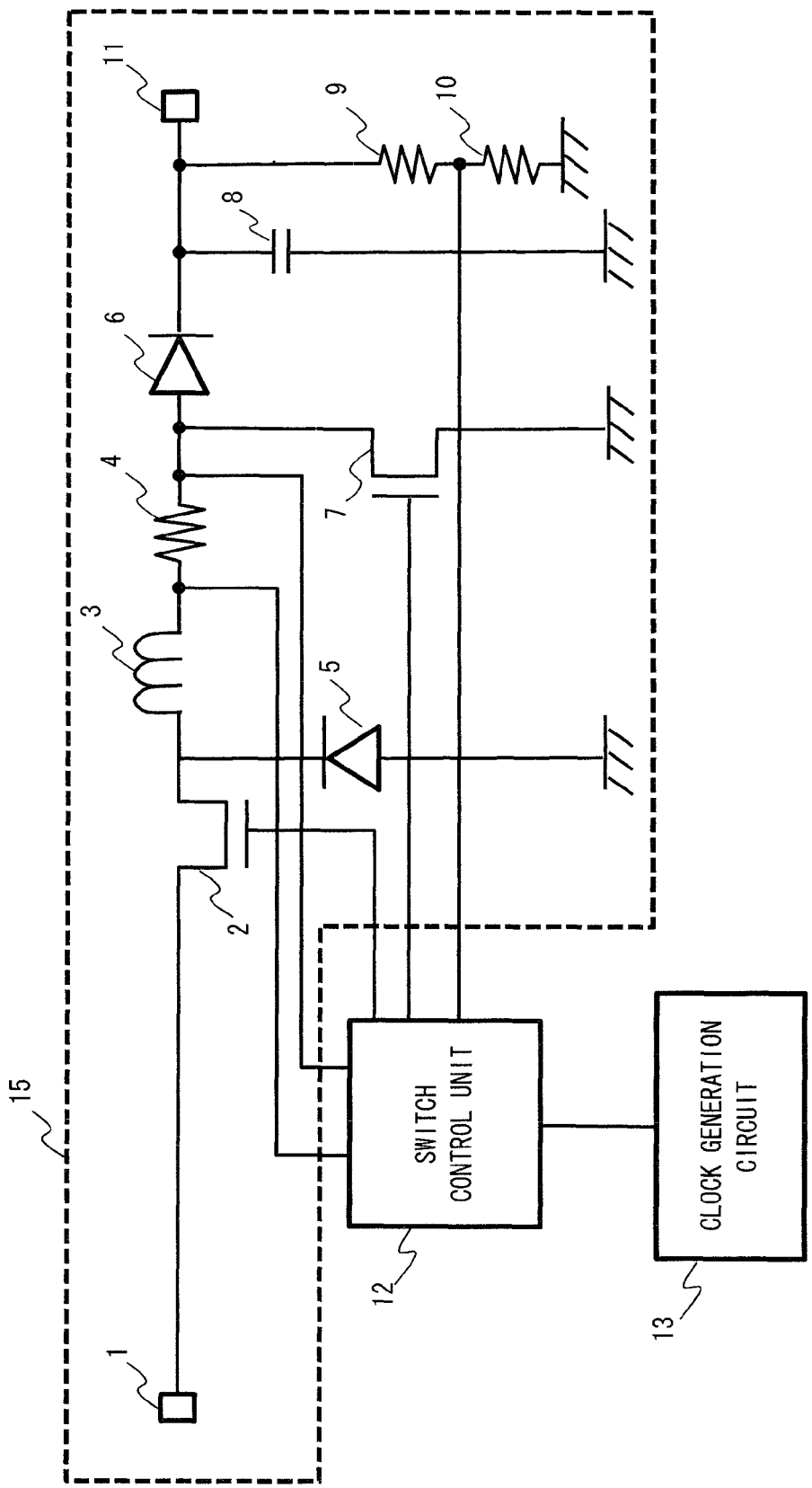
FIG. 1 is a configuration diagram of a voltage boosting/lowering circuit in accordance with a first exemplary embodiment of the present invention.

Exemplary embodiments of the present invention are explained hereinafter with reference to the drawings. A configuration example of a voltage boosting/lowering circuit in accordance with a first exemplary embodiment of the present invention is explained with reference to FIG. 1. The voltage boosting/lowering circuit includes an input terminal 1, a transistor 2, a choke coil 3, a resistor 4, flywheel diodes 5 and 6, a transistor 7, a capacitor 8, resistors 9 and 10, an output terminal 11, a switch control unit 12, and a clock generation circuit 13. The circuit composed of the elements other than the switch control unit 12 and the clock generation circuit 13 is defined as "output voltage generation circuit 15".

An input voltage Vi is input to the input terminal 1. The transistor 2, which is a switch element, is connected between the input terminal 1 and the choke coil 3. When the transistor 2 is turned on, the input terminal 1 is electrically connected to the choke coil 3 and the input voltage Vi is applied to one end of the choke coil 3.

When the input voltage Vi is applied to the choke coil 3, energy expressed as "$L \times I^2/2$" is accumulated in the choke coil 3. In the expression, L represents the inductance of the choke coil 3 and I represents a current generated in the coil. The flywheel diode 5 is connected between one end of the choke coil 3 and the ground in order to rectify the current generated in the choke coil 3. The resistor 4 is connected to one terminal of the choke coil 3 that is different from the terminal to which the transistor 2 is connected. The resistor 4 converts the current generated in the choke coil 3 into a voltage and outputs the converted voltage to the switch control unit 12, which is connected across the resistor 4.

The transistor 7, which is a switch element, is connected between one terminal of the resistor 4 and the ground terminal. Note that the transistor 7 is connected to one terminal of the resistor 4 that is different from the terminal to which the choke coil 3 is connected. When the transistor 7 is turned on, the one end of the choke coil 3 is brought to the ground potential through the resistor 4 and the transistor 7.

The flywheel diode 6 outputs the current generated in the choke coil 3 to the capacitor 8. The resistors 9 and 10 divide an output voltage to be output from the output terminal 11, and output the obtained voltage to the switch control unit 12. The clock generation circuit 13 generates a clock for lowering voltage and a clock for boosting voltage having different timings, and outputs the generated clocks to the switch control unit 12. The switch control unit 12 outputs a PWM signal, which is generated based on the clock for lowering voltage and the clock for boosting voltage, the voltage obtained by dividing the output voltage with the resistors 9 and 10, and a voltage appearing across the resistor 4, to the transistors 2 and 7. The PWM signal is used to control the switching of the transistors 2 and 7 between an On-state and an Off-state.

Figure 2:
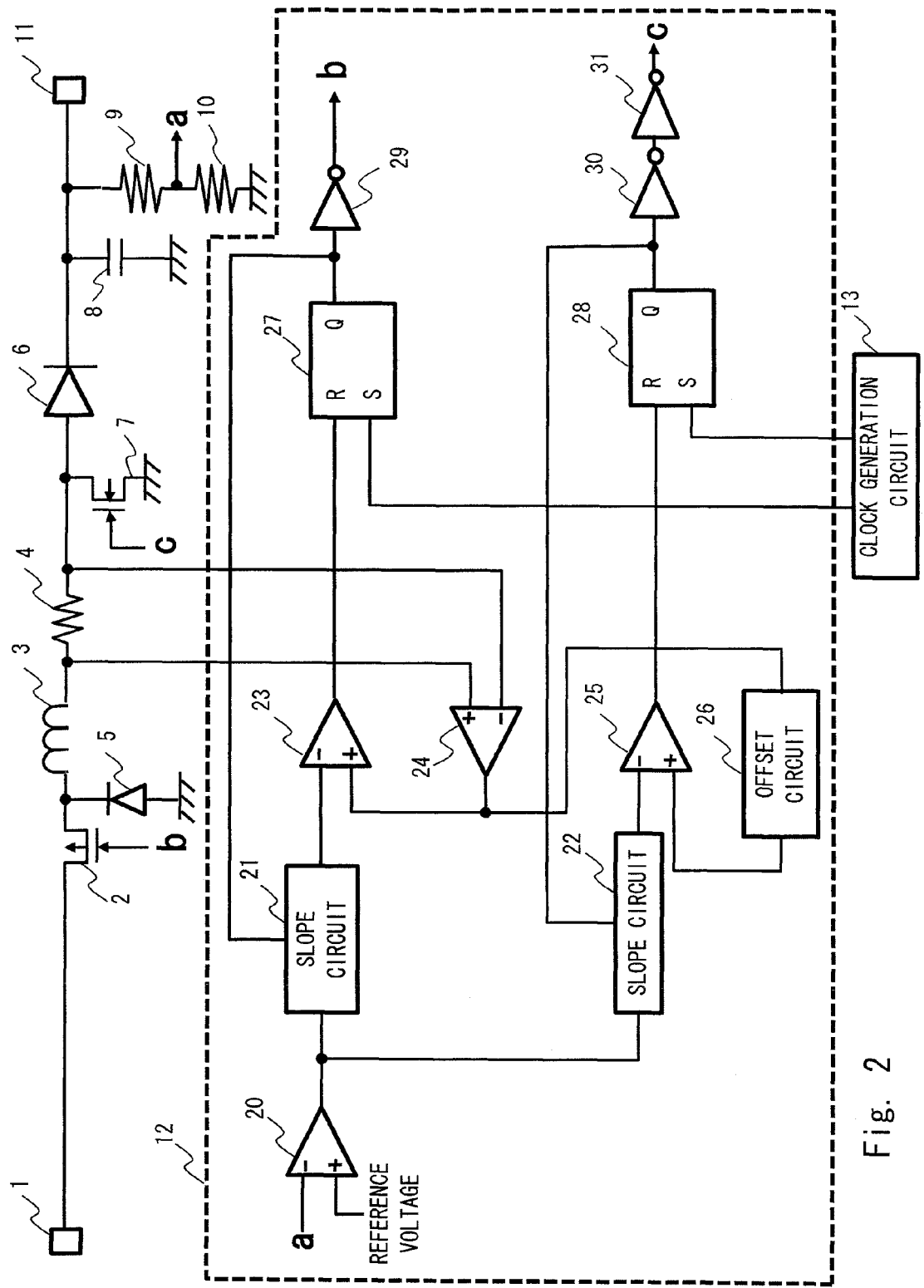
FIG. 2 is a configuration diagram of a control unit of a voltage boosting/lowering circuit in accordance with a first exemplary embodiment of the present invention.

Next, a detailed configuration example of a switch control unit of a voltage boosting/lowering circuit in accordance with the first exemplary embodiment of the present invention is explained with reference to FIG. 2. The configuration other than the switch control unit 12 is similar to that shown in FIG. 1, and therefore its explanation is omitted. The switch control unit 12 includes an error amplifier 20, SLOPE circuits 21 and 22, a comparator 23, a current detection circuit 24, a comparator 25, an offset circuit 26, RS latches 27 and 28, and inverters 29 to 31.

A reference voltage is input to the positive terminal of the error amplifier 20, and a voltage that is obtained by dividing the output voltage with the resistors 9 and 10 is input to the negative terminal of the error amplifier 20 as a feedback voltage. In the figure, the feedback voltage is indicated by a symbol "a". The reference voltage is determined based on a target output voltage to be output from the output terminal 11. Letting Vg stand for the target output voltage, the reference voltage is determined to be $\alpha V g$, i.e., a voltage obtained by multiplying the target output voltage Vg by an adequate coefficient $\alpha$. Further, the feedback voltage is defined as "$Vo \times R10/(R9+R10)$" where Vo is the voltage output from the output terminal 11, R9 is the resistance of the resistor 9, and R10 is the resistance of the resistor 10. The switch control unit 12 performs control so that the feedback voltage is brought closer to the reference voltage αVg, The error amplifier 20 outputs a voltage value obtained by amplifying the difference between αVg and Vo×R10/(R9+R10) to the SLOPE circuits 21 and 22. Each of the SLOPE circuits 21 and 22 generates a voltage having a constant slope with reference to the voltage output from the error amplifier 20. That is, each of the SLOPE circuits 21 and 22 lowers the voltage output from the error amplifier 20 over time. The SLOPE circuits 21 and 22 output the generated voltages to the comparators 23 and 25 respectively.

The comparator 23 compares the voltage output from the SLOPE circuit 21 with a voltage output from the current detection circuit 24, and outputs a H-level signal or a L-level signal to the RS latch 27. The voltage output from the current detection circuit 24 is a voltage that appears by the current flowing through the resistor 4. When the voltage output from the SLOPE circuit 21 is lower than the voltage output from the current detection circuit 24, the comparator 23 outputs a H-level signal to the RS latch 27. On the other hand, when the voltage output from the SLOPE circuit 21 is larger than the voltage output from the current detection circuit 24, the comparator 23 outputs a L-level signal to the RS latch 27.

The comparator 25 compares a voltage output from the SLOPE circuit 22 with a voltage output from the offset circuit 26, and outputs a H-level signal or a L-level signal to the RS latch 28. The offset circuit 26 generates a positive offset voltage, adds the offset voltage to a voltage output from the current detection circuit 24, and outputs the resultant voltage to the comparator 25. When the voltage output from the SLOPE circuit 22 is lower than the voltage output from the offset circuit 26, the comparator 25 outputs a H-level signal to the RS latch 28. On the other hand, when the voltage output from the SLOPE circuit 22 is higher than the voltage output from the offset circuit 26, the comparator 25 outputs a L-level signal to the RS latch 28.

A H-level signal or L-level signal output from the comparator 23 is input to the reset terminal of the RS latch 27, and a clock for lowering voltage, which is output from the clock generation circuit 13, is input to the set terminal of the RS latch 27. Similarly, a H-level signal or L-level signal output from the comparator 25 is input to the reset terminal of the RS latch 28, and a clock for boosting voltage, which is output from the clock generation circuit 13, is input to the set terminal of the RS latch 28. The RS latch 27 generates a H-level signal or L-level signal in response to the signal input to the set and reset terminals. Then, the RS latch 27 outputs the H-level signal or L-level signal to the SLOPE circuit 21 and the inverter 29. The operation of the SLOPE circuit 21 based on the signal output from the RS latch 27 will be described later in detail. Similarly, the RS latch 28 generates a H-level signal or L-level signal in response to the signal input to the set and reset terminals. Then, the RS latch 28 outputs the H-level signal or L-level signal to the SLOPE circuit 22 and the inverter 30.

The inverter 29 inverts the H-level signal or L-level signal obtained from the RS latch 27, and outputs the inverted signal to the transistor 2. The signal output from the inverter 29 to the transistor 2 is defined as "voltage lowering PWM signal" and indicated by a symbol "b" in the figure. In the figure, the transistor 2 is a PMOS transistor. Therefore, when a L-level signal is output from the inverter 29 to the transistor 2, the transistor 2 is turned on. When a H-level signal is output from the inverter 29 to the transistor 2, the transistor 2 is turned off.

The inverter 30 inverts the H-level signal or L-level signal obtained from the RS latch 28, and outputs the inverted signal to the inverter 31. The inverter 31 inverts the obtained signal and outputs the inverted signal to the transistor 7. The signal output from the inverter 31 to the transistor 7 is defined as "voltage boosting PWM signal" and indicated by a symbol "c" in the figure. In the figure, the transistor 7 is an NMOS transistor. Therefore, when a H-level signal is output from the inverter 31 to the transistor 7, the transistor 7 is turned on. When a L-level signal is output from the inverter 31 to the transistor 7, the transistor 7 is turned off.

Next, an operation of the voltage boosting/lowering circuit in accordance with the first exemplary embodiment of the present invention is explained with reference to FIG. 3. FIGS. 3(a) and 3(b) show output states of a clock for lowering voltage and a clock for boosting voltage. FIG. 3(c) shows output voltages of the error amplifier 20, the SLOPE circuit 21, the SLOPE circuit 22, the current detection circuit 24, and the offset circuit 26 in the switch control unit 12. FIGS. 3(d) and 3(e) show output states of a voltage lowering PWM signal and a voltage boosting PWM signal output to the transistors 2 and 7 respectively.

The clock generation circuit 13 outputs a clock for lowering voltage and a clock for boosting voltage. The clock for lowering voltage and the clock for boosting voltage have the same frequency and a given phase difference between them.

When the clock for lowering voltage rises, the output of the RS latch 27 is set to a H-level signal and the voltage lowering PWM signal, which is the inverted signal of the output of the RS latch 27, falls (time t1 and t5). The SLOPE circuit 21 performs a falling action only for periods during which the voltage lowering PWM signal is at a L-level. That is, the SLOPE circuit 21 outputs a voltage that starts at the output voltage of the error amplifier 20 and falls with a constant slope only for the periods during which the voltage lowering PWM signal is a L-level signal. As the voltage output from the SLOPE circuit 21 falls, the potential between the voltage output from the SLOPE circuit 21 and the voltage output from the current detection circuit 24 is reversed. As a result, the output of the comparator 23 becomes a H-level signal and the RS latch 27 is reset.

When the RS latch 27 is reset, the RS latch 27 outputs a L-level signal and the voltage lowering PWM signal, which is output to the transistor 2 through the inverter 29, rises (time t4). Further, the SLOPE circuit 21 stops the falling action at the timing at which the voltage lowering PWM signal rises, and outputs the voltage output from the error amplifier 20. The SLOPE circuit 21 detects the change of the output signal of the RS latch 27 from a H-level to a L-level. In this way, it can obtain the timing at which the voltage lowering PWM signal rises.

Next, when the clock for boosting voltage rises, the output of the RS latch 28 is set to a H-level signal and the voltage boosting PWM signal rises (time t2). The SLOPE circuit 22 performs a falling action only for periods during which the voltage boosting PWM signal is at a H-level. That is, the SLOPE circuit 22 outputs a voltage that starts at the output voltage of the error amplifier 20 and falls with a constant slope only for the periods during which the voltage boosting PWM signal is a H-level signal. Note that the SLOPE circuit 21 and the SLOPE circuit 22 are configured such that the slope with which the voltage of the SLOPE circuit 22 falls is gentler than the slope with which the voltage of the SLOPE circuit 21 falls. As the voltage output from the SLOPE circuit 22 falls, the potential between the voltage output from the SLOPE circuit 22 and the voltage output from the offset circuit 26 is reversed. As a result, the output of the comparator 25 becomes a H-level signal and the RS latch 28 is reset.

When the RS latch 28 is reset, the RS latch 28 outputs a L-level signal and the voltage boosting PWM signal, which is output to the transistor 7 through the inverters 30 and 31, falls (time t3). Further, the SLOPE circuit 22 stops the falling action at the timing at which the voltage boosting PWM signal falls, and outputs the voltage output from the error amplifier 20. The SLOPE circuit 22 detects the change of the output signal of the RS latch 28 from a H-level to a L-level, and thereby can obtain the timing at which the voltage boosting PWM signal falls.

Figure 3:
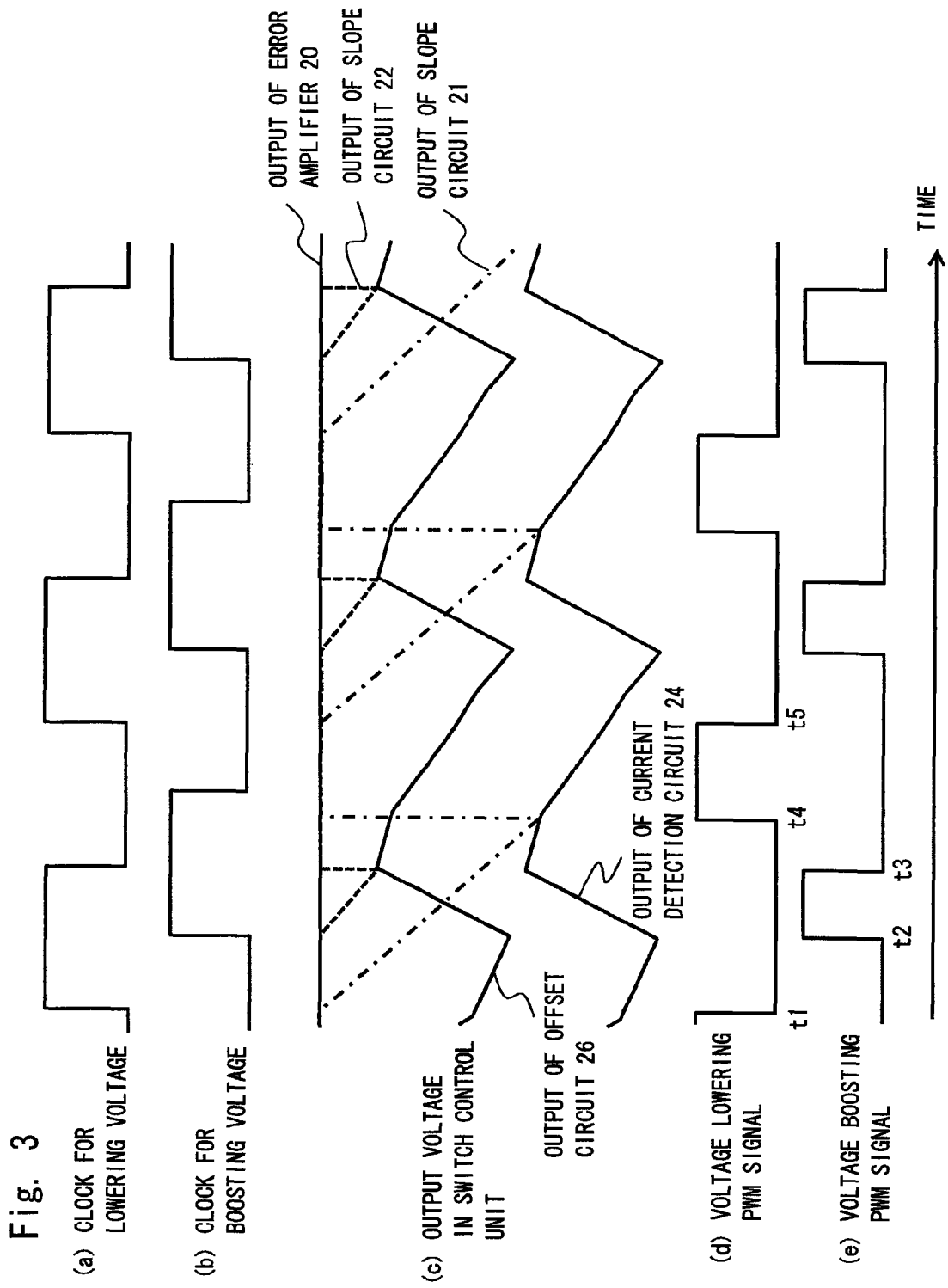
FIG. 3 is a graph showing an operation a voltage boosting/lowering circuit in accordance with a first exemplary embodiment of the present invention.
Figure 4:
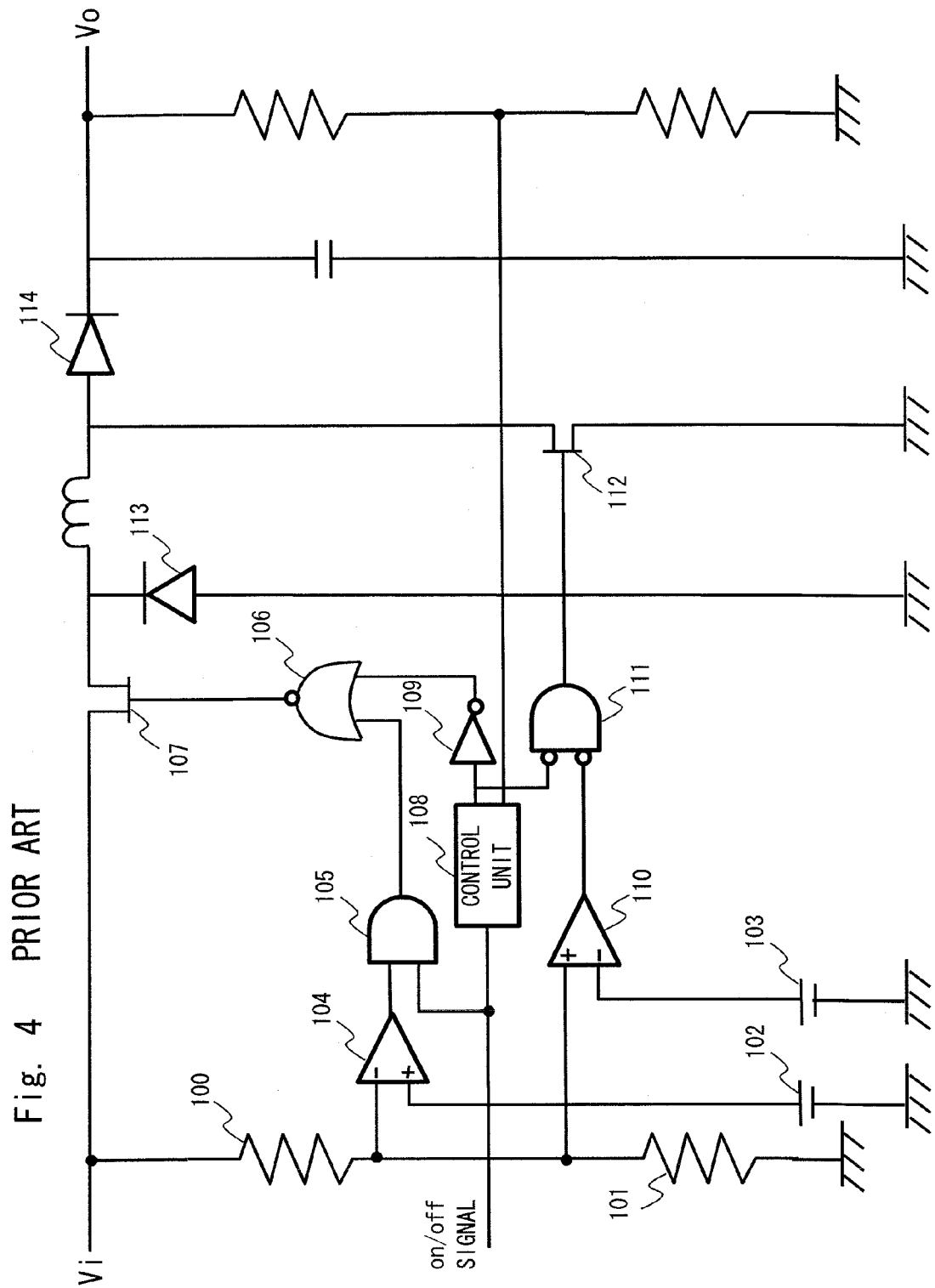
FIG. 4 is a configuration diagram of a voltage boosting/lowering circuit in accordance with Patent document 1.

Further, as shown in FIG. 3, by shifting the timings of the clock for lowering voltage and the clock for boosting voltage from each other, i.e., shifting their phases from each other, it is possible to shift the falling timing of the voltage lowering PWM signal and the rising timing of the voltage boosting PWM signal from each other. Further, the voltage boosting PWM signal is raised from a L-level to a H-level and then lowered from the H-level to the L-level within a period during which the voltage lowering PWM signal is a L-level signal. Furthermore, the voltage lowering PWM signal is raised from a L-level to a H-level and then lowered from the H-level to the L-level within a period during which the voltage boosting PWM signal is a L-level signal. The offset voltage in the offset circuit 26 and the slopes with which the voltages of the SLOPE circuits 21 and 22 are lowered are determined so that the above-described PWM signal operation is performed.

With the operation described above, the transistor 2 becomes an On-state and the transistor 7 becomes an Off-state during the period from the time t1 to the time t2. As a result, a current is generated and thereby energy is accumulated in the choke coil 3. A voltage obtained by adding the voltage generated by the energy accumulated in the choke coil 3 to the input voltage Vi is applied to the flywheel diode 6. Further, the flywheel diode 6 becomes a forward bias state, and discharging to the capacitor 8 is thereby carried out. Further, during the period from the time t2 to the time t3, the transistor 7 becomes an On-state and the transistor 2 is also already in the On-state. Therefore, one end of the choke coil 3 is grounded through the transistor 7 and the resistor 4. As a result, the entire input voltage Vi is applied to the choke coil 3 and the current flowing to the choke coil 3 increases. Therefore, the energy accumulated in the choke coil 3 increases even further. In this state, when the transistor 7 becomes an Off-state during the period from the time t3 to time t4, a voltage obtained by adding the voltage generated by the energy accumulated in the choke coil 3 to the input voltage Vi is applied to the input-side terminal of the flywheel diode 6, which is connected to the choke coil 3. Further, the flywheel diode 6 becomes a forward bias state, and discharging to the capacitor 8 is thereby carried out. The above-described operation becomes a voltage-boosting operation that boosts the input voltage Vi.

During the period from the time t4 to the time t5, the transistor 2 becomes an Off-state. Therefore, the application of the input voltage Vi to the choke coil 3 is stopped. Further, the transistor 7 also keeps an Off-state. As a result, only the voltage generated by the energy accumulated in the choke coil 3 is applied to the input-side terminal of the flywheel diode 6, and discharging to the capacitor 8 is carried out. Therefore, since the input voltage Vi is excluded, a voltage-lowering operation is performed by an amount equivalent to the input voltage Vi in comparison to the period from the time t3 to the time t4. The above-described operation is repeated at and after the time t5.

Next, an operation in a case where the input voltage Vi is sufficiently higher than the target output voltage Vg is explained. When the input voltage Vi is sufficiently high, a sufficiently high voltage is output from the current detection circuit 24. Therefore, for the current detection circuit 24, the voltage input from the offset circuit 26 is always made larger than the voltage output from the SLOPE circuit 22, and the RS latch 28 is thereby always in a reset state. As a result, when the input voltage Vi is sufficiently higher than the target output voltage Vg, only the voltage-lowering operation can be performed.

Further, an operation in a case where the input voltage Vi is sufficiently lower than the target output voltage Vg is explained. When the input voltage Vi is sufficiently low, a very low voltage is output from the current detection circuit 24. As a result, in the comparator 23, the voltage output from the SLOPE circuit 21 never intersects the potential of the voltage output from the current detection circuit 24. Consequently, the voltage lowering PWM signal is always a L-level signal, and therefore only the voltage-boosting operation can be performed.

As has been explained above, in the voltage boosting/lowering circuit in accordance with the first exemplary embodiment of the present invention, the voltage lowering PWM signal and the voltage boosting PWM signal output to the transistors 2 and 7 respectively do not overlap each other. That is, the falling timing of the voltage lowering PWM signal and the rising timing of the voltage boosting PWM signal do not overlap each other, and the rising timing of the voltage lowering PWM signal and the falling timing of the voltage boosting PWM signal also do not overlap each other. Therefore, when the input voltage Vi is close to the target output voltage Vg, a voltage-boosting operation and a voltage-lowering operation are repeated in a time-division manner. In this manner, it is possible to perform negative feedback control in which the output voltage Vo is constantly detected. Therefore, the fluctuations in the output voltage that occur when the input voltage Vi gets close to the target output voltage Vg can be reduced.

Note that the present invention is not limited to the above-described exemplary embodiments, and various modifications can be made without departing from the spirit and scope of the present invention. For example, the SLOPE circuits 21 and 22 may lower the voltage output from the error amplifier 20 in different manners from the above-described manner in which the voltage is lowered with a constant slope. Specifically, they may lower the voltage along such a curve that its slope changes over time.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A voltage boosting/lowering circuit comprising:
   an output voltage generation circuit comprising a first switch element connected between an input terminal and one end of a choke coil and a second switch element connected between another end of the choke coil and a ground terminal, the output voltage generation circuit being configured to boost or lower an input voltage input to the input terminal and thereby to generate an output voltage by switching the first and second switch elements between an On-state and an Off-state;
   a clock generation circuit that generates first and second clocks having different timings; and a switch control unit that performs switching control of the first and second switch elements based on the first and second clocks so that negative feedback control is performed so as to bring the output voltage to a target output voltage, wherein:

the switch control unit further comprises:

an error amplifier that amplifies and outputs a difference between a feedback voltage determined based on the output voltage and a first reference voltage determined based on the target output voltage;

a current detection circuit that generates a second reference voltage determined based on a change of a current output from the choke coil; and a first slope circuit that lowers a voltage output from the error amplifier over time, and wherein:

the switch control unit performs switching control of the first and second switch elements based on output results of the error amplifier and the current detection circuit, and the switch control unit brings the first switch element into an Off-state when a voltage output from the first slope circuit becomes lower than the second reference voltage output from the current detection circuit.

2. The voltage boosting/lowering circuit according to claim 1, wherein the switch control unit performs voltage-boosting control and voltage-lowering control at different timings, in the voltage-boosting control, an input voltage being boosted by switching the second switch element between an On-state and an Off-state while the first switch element is in an On-state, and in the voltage-lowering control, the input voltage being lowered by switching the first switch element between an On-state and an Off-state while the second switch element is in an Off-state.

3. The voltage boosting/lowering circuit according to claim 1, wherein the first slope circuit lowers a voltage output from the error amplifier with a constant slope when the first switch element is in an On-state.

4. A voltage boosting/lowering circuit comprising:

an output voltage generation circuit comprising a first switch element connected between an input terminal and one end of a choke coil and a second switch element connected between another end of the choke coil and a ground terminal, the output voltage generation circuit being configured to boost or lower an input voltage input to the input terminal and thereby to generate an output voltage by switching the first and second switch elements between an On-state and an Off-state;

a clock generation circuit that generates first and second clocks having different timings; and a switch control unit that performs switching control of the first and second switch elements based on the first and second clocks so that negative feedback control is performed so as to bring the output voltage to a target output voltage, wherein:

the switch control unit further comprises:

an error amplifier that amplifies and outputs a difference between a feedback voltage determined based on the output voltage and a first reference voltage determined based on the target output voltage;

a current detection circuit that generates a second reference voltage determined based on a change of a current output from the choke coil;

a first slope circuit that lowers a voltage output from the error amplifier with a constant slope; and an offset circuit that adds an offset voltage to the second reference voltage output from the current detection circuit, and wherein:

the switch control unit performs switching control of the first and second switch elements based on output results of the error amplifier and the current detection circuit, and the switch control unit brings the second switch element into an Off-state when a voltage value output from the first slope circuit becomes lower than a voltage output from the offset circuit.

5. The voltage boosting/lowering circuit according to claim 4, wherein the first slope circuit lowers a voltage output from the error amplifier with a constant slope when the second switch element is in an On-state.

* * * * *